(12) United States Patent
Stark et al.

(10) Patent No.: US 7,925,675 B2
(45) Date of Patent: *Apr. 12, 2011

(54) DATA EXCHANGE TOOL

(75) Inventors: David Stark, Lakeville, MN (US); Mary Stark, Lakeville, MN (US)

(73) Assignee: Stark Consulting Group, Inc., Lakeville, MN (US)

( * ) Notice: Subject to any disclaimer, the term of this patent is extended or adjusted under 35 U.S.C. 154(b) by 456 days.

This patent is subject to a terminal disclaimer.

(21) Appl. No.: 12/036,786

(22) Filed: Feb. 25, 2008

(65) Prior Publication Data

US 2008/0189322 A1    Aug. 7, 2008

Related U.S. Application Data

(63) Continuation of application No. 11/217,136, filed on Aug. 31, 2005, now Pat. No. 7,337,192, which is a continuation of application No. 10/155,903, filed on May 24, 2002, now abandoned.

(60) Provisional application No. 60/293,317, filed on May 24, 2001.

(51) Int. Cl.
*G06F 7/00* (2006.01)
*G06F 17/30* (2006.01)

(52) U.S. Cl. .................. 707/802; 707/791; 707/822
(58) Field of Classification Search .............. 715/239, 715/236, 249; 707/765, 758, 791, 822, 802
See application file for complete search history.

(56) References Cited

U.S. PATENT DOCUMENTS

| 5,619,685 | A | 4/1997 | Schiavone |
| 5,848,415 | A | 12/1998 | Guck |
| 6,199,068 | B1 * | 3/2001 | Carpenter ........................ 1/1 |
| 6,708,166 | B1 * | 3/2004 | Dysart et al. .................. 707/765 |
| 6,728,933 | B1 | 4/2004 | Heenehan |
| 2002/0099735 | A1 * | 7/2002 | Schroeder et al. ............ 707/513 |

FOREIGN PATENT DOCUMENTS

| EP | 1 122 652 A1 | 8/2001 |
| WO | WO 01/31885 A2 | 5/2001 |

* cited by examiner

*Primary Examiner* — Giovanna Colan
(74) *Attorney, Agent, or Firm* — Patterson Thuente Christensen Pedersen, P.A.

(57) ABSTRACT

A software reference tool and method enables users to easily understand XML and other file types, including proprietary file types, and that provides the user the capability to map from one file type to another by using system templates that correspond to each file type. The data mapped from one file type to another has been pre-programmed or selected by the user to include only the data elements that are key to the transaction involved.

5 Claims, 8 Drawing Sheets

DATA EXCHANGE TOOL

RELATED APPLICATIONS

This is a continuation of U.S. application Ser. No. 11/217,136, filed Aug. 31, 2005, entitled "DATA EXCHANGE TOOL", now issued as U.S. Pat. No. 7,337,192, which claims priority to and is a continuation of U.S. application Ser. No. 10/155,903, filed May 24, 2002, entitled, "DATA EXCHANGE TOOL," which claims priority to U.S. Provisional Application No. 60/293,317, filed, May 24, 2001, entitled, "DATA EXCHANGE TOOL," all of which are fully incorporated herein by reference.

COMPACT DISC

A compact disc containing codes and information describing a preferred embodiment of the present invention was submitted in the priority applications and is hereby incorporated by reference. The compact disc contains the following files and/or programs:

| Title | Size in Bytes | Date of Creation |
|---|---|---|
| autorun.inf | 73 | Nov. 2, 2001 |
| autox86.exe | 44,544 | Jan. 4, 2001 |
| MapList.CAB | 11,167,375 | May 23, 2002 |
| Notes.doc | 11,264 | May 23, 2002 |
| setup.exe | 139,776 | May 23, 2002 |
| Setup.Lst | 7,702 | May 23, 2002 |
| msxml3spl.EXE | 669,312 | May 1, 2001 |
| ChkDemo.bas | 6,816 | May 23, 2002 |
| cIsMapAttributes.cls | 10,061 | May 23, 2002 |
| cIsStandardList.cls | 15,376 | May 23, 2002 |
| cistbiAllParent.cls | 21,575 | May 23, 2002 |
| clstbl CalcOperators. cis | 11,039 | May 23, 2002 |
| clstblCompany.cls | 11,700 | May 23, 2002 |
| clstbl Compare. cis | 18,897 | May 23, 2002 |
| clstblFormats.cls | 16,713 | May 23, 2002 |
| clsTblListReports.cls | 20,310 | May 23, 2002 |
| clstblMap.cls | 38,650 | May 23, 2002 |
| clstblProcess.cls | 11,532 | May 23, 2002 |
| clstblProcessList.cls | 11,412 | May 23, 2002 |
| clstblTem plate. cis | 31,874 | May 23, 2002 |
| clstblTem plate1-ist. cis | 15,727 | May 23, 2002 |
| clstblVisalnvoiceVl.cls | 4,433 | May 23, 2002 |
| cistlbListDataTypes.cls | 9,584 | May 23, 2002 |
| error.log | 222,935 | May 23, 2002 |
| errorlog.bas | 3,528 | May 23, 2002 |
| frmAdmin.frm | 8,154 | May 23, 2002 |
| frmComplexField.frm | 33,904 | May 23, 2002 |
| frmComplexField.frx | 32,507 | May 23, 2002 |
| frmCondition.frm | 8,701 | May 23, 2002 |
| frmCopyMap.frm | 4,111 | May 23, 2002 |
| frmCritNotes.frm | 3,221 | May 23, 2002 |
| frmDefineFlat.frm | 81,747 | May 23, 2002 |
| frm Define Flat.frx | 20,782 | May 23, 2002 |
| frmDialogMapName.frm | 8,016 | May 23, 2002 |
| frmEditHelp.frm | 9,600 | May 23, 2002 |
| frmEditHelp.frx | 3,855 | May 23, 2002 |
| frmEditMap.frm | 9,091 | May 23, 2002 |
| frmEditTemp.frm | 9,421 | May 23, 2002 |
| frmElementListHelp.frm | 2,210 | May 23, 2002 |
| frmErrorTxt.frm | 12,225 | May 23, 2002 |
| frmExport.frm | 26,887 | May 23, 2002 |
| frmFind.frm | 12,943 | May 23, 2002 |
| frmFind.frx | 504 | May 23, 2002 |
| frmFindFile.frm | 5,249 | May 23, 2002 |
| frmHelp.frm | 3,886 | May 23, 2002 |
| frmHelp.frx | 132 | May 23, 2002 |
| frmHubUnkView.frm | 22,085 | May 23, 2002 |
| frmHubUnkView.frx | 236 | May 23, 2002 |
| frmimport.frm | 25,918 | May 23, 2002 |
| frmImportDeffrm | 15,486 | May 23, 2002 |
| frmlmportDeffrx | 2,527 | May 23, 2002 |
| fmimportPath.frm | 5,826 | May 23, 2002 |
| frmLinkHubs.frm | 30,094 | May 23, 2002 |
| frmUnkHubs.frx | 8 | May 23, 2002 |
| frmLinkReplace.frm | 3,913 | May 23, 2002 |
| fmMap.frm | 273,926 | May 23, 2002 |
| frmMap.frx | 30,738 | May 23, 2002 |
| fmMapReports.frm | 2,234 | May 23, 2002 |
| fmMapView.frm | 13,661 | May 23, 2002 |
| frmMapView2.frm | 2,234 | May 23, 2002 |
| fm Match DicUrm | 5,657 | May 23, 2002 |
| frmMatchStandard.fm | 8,698 | May 23, 2002 |
| frmNewDict.frm | 3,369 | May 23, 2002 |
| fmNewMap.frm | 17,905 | May 23, 2002 |
| fmNewMap.frx | 4 | May 23, 2002 |
| fmProblern.frm | 6,482 | May 23, 2002 |
| fmProgressBar.frm | 3,097 | May 23, 2002 |
| fmlRefl-ibraryDeffrm | 9,322 | May 23, 2002 |
| fmRefUbraryDef.frx | 2,531 | May 23, 2002 |
| frmRptListEdit.frm | 5,188 | May 23, 2002 |
| frmRptUstEdit.frx | 2,531 | May 23, 2002 |
| fmSelMap.frm | 5,153 | May 23, 2002 |
| fmSelTemp.frm | 5,158 | May 23, 2002 |
| fmSpokefm | 19,223 | May 23, 2002 |
| fmSpoke.frx | 4 | May 23, 2002 |
| fmTem plate Def2.frm | 9,752 | May 23, 2002 |
| fmTemplateDef2.frx | 2,531 | May 23, 2002 |
| fmTemplateViewer.frm | 24,934 | May 23, 2002 |
| fmTemplateViewer.frx | 32,464 | May 23, 2002 |
| fmUtility.frm | 5,671 | May 23, 2002 |
| fmWaifflindowfm | 1,815 | May 23, 2002 |
| MainStart.bas | 104,581 | May 23, 2002 |
| MapList.exe | 2,076,672 | May 23, 2002 |
| MapList.vbp | 3,477 | May 23, 2002 |
| MapList.vbw | 3,183 | May 23, 2002 |
| modCompareMap.bas | 67,621 | May 23, 2002 |
| modMakeXML.bas | 46,043 | May 23, 2002 |
| notrptLinkList4WithNotesold.rpt | 146,432 | May 23, 2002 |
| rptFileCom pare. rpt | 34,816 | Apr. 22, 2002 |
| rptFileCom pareW ith Notes. rpt | 129,536 | May 23, 2002 |
| rptGapMaptoHub.rpt | 231,936 | May 23, 2002 |
| rptGapMaptoHubPortrait.rpt | 230,400 | Apr. 29, 2002 |
| rptinandOut.rpt | 32,768 | May 1, 2002 |
| rptinandOut3.rpt | 38,912 | May 23, 2002 |
| rptinandOut4.rpt' | 49,152 | May 1, 2002 |
| rptLinkListl WithNotes.rpt | 45,568 | May 1, 2002 |
| rptLin kList2W ith Notes. rpt | 46,080 | Apr. 29, 2002 |
| rptLin kUst3W ith Notes. rpt | 143,872 | Apr. 29, 2002 |
| rptLin kList4W ith Notes. rpt | 145,920 | May 23, 2002 |
| rptLin Wst5With Notes. rpt | 239,104 | May 23, 2002 |
| rptTemplate.rpt | 44,544 | May 23, 2002 |
| rptTree. rpt | 33,280 | May 23, 2002 |
| rptTreeNoErr.rpt | 33,280 | May 23, 2002 |
| rptTree N o E rrW ith N otes. rpt | 30,720 | May 23, 2002 |
| StarkXML.mdb | 6,299,648 | May 23, 2002 |
| msxm13sp1.EXE | 669,312 | May 1, 2001 |
| ChkDemo.bas | 6,816 | May 23, 2002 |
| cIsMapAttributes.cls | 10,061 | May 23, 2002 |
| cIsStandardList.cls | 15,376 | May 23, 2002 |
| c1stbIA11 Parent. cls | 21,575 | May 23, 2002 |
| clstblCaIcOperators.cls | 11,039 | May 23, 2002 |
| clstblCompany.cls | 11,700 | May 23, 2002 |
| clstblCompare.cls | 18,897 | May 23, 2002 |
| c1stbl Form ats.cls | 16,713 | May 23, 2002 |
| cIsTblUstReports.cIs | 20,310 | May 23, 2002 |
| clstblMap.cls | 38,650 | May 23, 2002 |
| c1stblProcess.cls | 11,532 | May 23, 2002 |
| cistblProcessList.cls | 11,412 | May 23, 2002 |
| clstblTemplate.cls | 31,874 | May 23, 2002 |
| clstbiTemplateList.cis | 15,727 | May 23, 2002 |
| cIstblVisaInvoiceV1.cIs | 4,433 | May 23, 2002 |
| cIstIbUstDataTypes.cIs | 9,584 | May 23, 2002 |
| error.log | 222,935 | May 23, 2002 |
| errorlog.bas | 3,528 | May 23, 2002 |
| fmAdmin.fm | 8,154 | May 23, 2002 |
| fmComplexField.fm | 33,904 | May 23, 2002 |
| frmComplexField.frx | 32,507 | May 23, 2002 |
| frmCondition.frm | 8,701 | May 23, 2002 |

-continued

| Title | Size in Bytes | Date of Creation |
|---|---|---|
| frmCopyMap.frm | 4,111 | May 23, 2002 |
| frmCritNotes.frm | 3,221 | May 23, 2002 |
| frmDefineFlat.frm | 81,747 | May 23, 2002 |
| frmDefineFlat.frx | 20,782 | May 23, 2002 |
| frmDialogMapName.frm | 8,016 | May 23, 2002 |
| frmEditHelp.frm | 9,600 | May 23, 2002 |
| frmEditHelp.frx | 3,855 | May 23, 2002 |
| frmEditMap.frm | 9,091 | May 23, 2002 |
| frmEditTemp.frm | 9,421 | May 23, 2002 |
| frmElementListHelp.frm | 2,210 | May 23, 2002 |
| frm ErrorTxt.frm | 12,225 | May 23, 2002 |
| frm Export.frm | 26,887 | May 23, 2002 |
| frmFind.frm | 12,943 | May 23, 2002 |
| frmFind.frx | 504 | May 23, 2002 |
| frmFindFilefrm | 5,249 | May 23, 2002 |
| frmHelp.frm | 3,886 | May 23, 2002 |
| frmHelp.frx | 132 | May 23, 2002 |
| frmHubLinkView.frm | 22,085 | May 23, 2002 |
| frmHubLinkView.frx | 236 | May 23, 2002 |
| frmimport.frm | 25,918 | May 23, 2002 |
| frmImportDef.frm | 15,486 | May 23, 2002 |
| frmImportDef.frx | 2,527 | May 23, 2002 |
| frmImportPath.frm | 5,826 | May 23, 2002 |
| frmLinkHubs.frm | 30,094 | May 23, 2002 |
| frmLinkHubs.frx | 8 | May 23, 2002 |
| frmLinkReplace.frm | 3,913 | May 23, 2002 |
| frmMap.frm | 273,926 | May 23, 2002 |
| frmMap.frx | 30,738 | May 23, 2002 |
| frmMapReports.frm | 2,234 | May 23, 2002 |
| frmMapView.frm | 13,661 | May 23, 2002 |
| frmMapView2.frm | 2,234 | May 23, 2002 |
| frm Match DicUrm | 5,657 | May 23, 2002 |
| frmMatchStandard.frm | 8,698 | May 23, 2002 |
| frmNewDict.frm | 3,369 | May 23, 2002 |
| frmNewMap.frm | 17,905 | May 23, 2002 |
| frmNewMap.frx | 4 | May 23, 2002 |
| frmProblem.frm | 6,482 | May 23, 2002 |
| frm Progress Bar.frm | 3,097 | May 23, 2002 |
| frmlRefl-ibraryDeffrm | 9,322 | May 23, 2002 |
| frmRefLibraryDef.frx | 2,531 | May 23, 2002 |
| frmRptUstEdit.frm | 5,188 | May 23, 2002 |
| frmRptUstEdit.frx | 2,531 | May 23, 2002 |
| frmSelMapJrm | 5,153 | May 23, 2002 |
| frmSeffemp.frm | 5,158 | May 23, 2002 |
| frmSpoke.frm | 19,223 | May 23, 2002 |
| frmSpoke.frx | 4 | May 23, 2002 |
| frmTemplateDef2ftm | 9,752 | May 23, 2002 |
| frmTemplateDef21rx | 2,531 | May 23, 2002 |
| frmTemplateViewer.frm | 24,934 | May 23, 2002 |
| frmTemplateViewer.frx | 32,464 | May 23, 2002 |
| frmUtility.frm | 5,671 | May 23, 2002 |
| frmWaifflindowftm | 1,815 | May 23, 2002 |
| MainStart.bas | 104,581 | May 23, 2002 |
| MapList.exe | 2,076,672 | May 23, 2002 |
| MapList.vbp | 3,477 | May 23, 2002 |
| MapList.vbw | 3,183 | May 23, 2002 |
| modCompareMap.bas | 67,621 | May 23, 2002 |
| modMakeXML.bas | 46,043 | May 23, 2002 |
| notrptUnkUst4WithNotesold.rpt | 146,432 | May 23, 2002 |
| rptF i IeCom pare. rpt | 34,816 | Apr. 22, 2002 |
| rptFileCom pareW ith Notes. rpt | 129,536 | May 23, 2002 |
| rptGapMaptoHub.rpt | 231,936 | May 23, 2002 |
| rptGapMaptoHubPortrait.rpt | 230,400 | Apr. 29, 2002 |
| rptinandOut.rpt | 32,768 | May 1, 2002 |
| rptinandOut3.rpt | 38,912 | May 23, 2002 |
| rptlnandOut4.rpt | 49,152 | May 1, 2002 |
| rptLinkListl WithNotes.rpt | 45,568 | May 1, 2002 |
| rptLin kUst2W ith Notes. rpt | 46,080 | Apr. 29, 2002 |
| rptLin kUst3W ith Notes. rpt | 143,872 | Apr. 29, 2002 |
| rptUnkUst4WithNotes.rpt | 145,920 | May 23, 2002 |
| rptLinkList5W ith Notes. rpt | 239,104 | May 23, 2002 |
| rptTemplate.rpt | 44,544 | May 23, 2002 |
| rptTree.rpt | 33,280 | May 23, 2002 |
| rptTreeNoErr.rpt | 33,280 | May 23, 2002 |
| rptTreeNoErrW ith Notes. rpt | 30,720 | May 23, 2002 |
| StarkXML.mdb | 6,299,648 | May 23, 2002 |

FIELD OF THE INVENTION

The present invention is related to data exchange and, more particularly, to interfacing disparate data transmission protocols.

BACKGROUND OF THE INVENTION

In today's business-to-business e-commerce environments, purchase order and invoice information are often carried in XML (Extensible Markup Language), EDI (Electronic Data Interchange), or proprietary transmission packages over the Internet or private networks, while trading partners deal with the payment side of the transaction through other channels. According to a study done by the Small Business Association in June of 2000, "The transaction value of B2B e-commerce over the Internet is expected to be $2 trillion by 2003, and an additional $780 billion in purchases will be made over private networks using electronic data interchange (EDI).

The multitude of data protocol transmission formats coupled with the multitude of unique and elaborate information sets in varying formats, such as those required by ERP (Enterprise Resource Planning), EPE (Electronic Procurement Engine) systems, etc., make the translation of data a very tedious and complex task.

A basic business requirement exists to translate and match appropriate information between disparate protocols, information systems, payment mechanisms, and trading partners. Businesses need to quickly assess a trading partner's data standards against their own internal set of requirements, and to quickly develop matching strategy necessary to efficiently and effective conduct business.

Further, in today's e-commerce environment, shipments are often made from multiple locations on different dates against multiple purchase orders. Trading partners, in some cases, are known entities with the buyer and selling having pre-defined payment terms. The opposite situation also exists where credit is a key component of the transaction. In the real world, it is the complexity of the order, fulfillment, and shipping process that adds significant dimensions to the problem. As an example, standing orders with releases translating into shipments from multiple warehouses to multiple locations is an everyday occurrence.

A significant problem for the e-commerce model is the reconciliation of payments against the above-mentioned scenario. If one then adds both shipping costs and taxes assessed, we now have a high level picture of the real opportunity.

It is the reconciliation of order and invoice information with the financial transaction that often becomes mission critical for businesses today. It is a key business requirement that financial institutions be able to match payment information with order, shipment, and invoice information. It is also critical that financial institutions be able to easily interface with the various e-commerce partners to provide the bank's real added value.

In order for e-commerce partners, particularly financial partners, to accept a standard XML feed from clients, they need to quickly understand what other systems are capable of sending and receiving. For example, if a bank wanted to build a map to Commerce One, it would need to know what Commerce One is expecting to receive and how that information compares to its key financial and enhanced payment data. If two Electronic Procurement Systems are using xCBL and cXML respectively, sending similar data, with individual data elements labeled differently, or if there are gaps in either version, it can be a very time-consuming process to find these differences and accommodate them. Yet, in most environments, partners must be able to process information from a wide array of file types.

SUMMARY OF THE INVENTION

The present invention may generally be thought of as a software reference tool that enables users to easily understand XML and other file types, including proprietary file types, and that provides the user the capability to map from one file type to another by using system templates that correspond to each file type. The data mapped from one file type to another has been pre-programmed or selected by the user to include only the data elements that are key to the transaction involved.

DETAILED DESCRIPTION OF THE PREFERRED EMBODIMENTS

The data exchange tool software of the present invention provides the user with a reference tool that enables them to easily understand XML, and other file types, through use of a built-in set of library templates. The data exchange tool of the present invention also assists the user in matching new file types to internal proprietary data elements. This enables partners to react quickly and completely to share data with trading partners. The present invention can assist key consultative personnel in improving partner and customer communications, and can significantly reduce the time to implement system changes required for trading partners to exchange information. Through productivity increases, a portable knowledge base, and use as a self-training tool, clients can achieve improved implementation times, superior data accuracy, and an enhanced image as an intelligent, engaged partner.

Further, the present invention facilitates the ability to reconcile order and invoice information with the financial transaction as well as facilitate the abilities to match payment information with order, shipment and invoice information. While the invention is particularly suited to handling exchanges of financial transaction data, other types of data may be exchanged through use of the data exchange too without departing from the spirit or scope of the invention.

Figure 1:
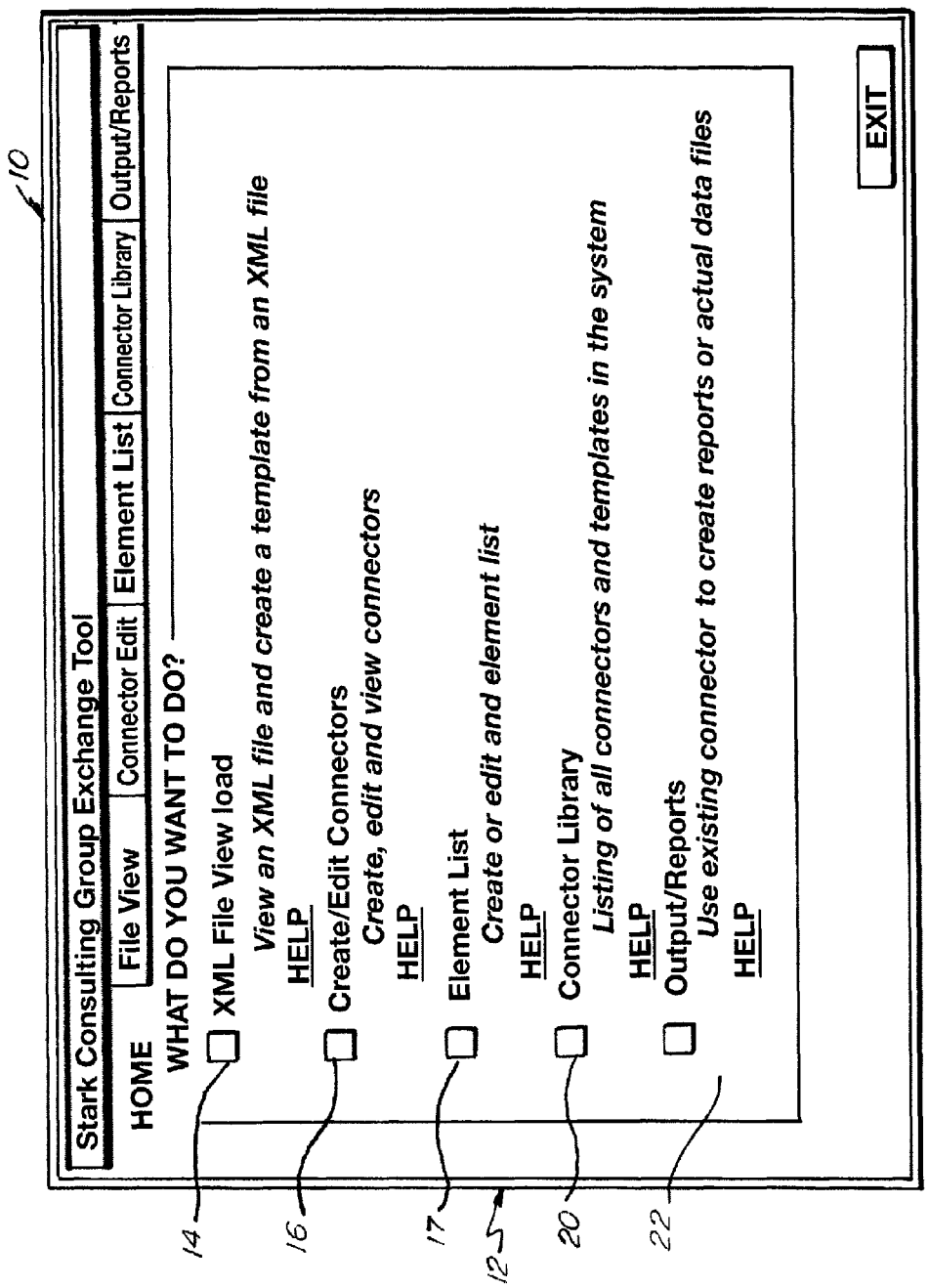
FIG. 1 is an example of a home page screen that may be used to initiate the data exchange tool of the present invention.

The data exchange tool 10 is initiated through use of the screen 12 shown in FIG. 1. As shown, it provides the user with the following selection options: 1. XML file view/load, per button 14 wherein the user may view a loaded XML file or create a template from a loaded XML file; 2. Create/Edit Connectors, per button 16, wherein the user may create, edit, and view connectors; 3. Element List, per button 18, wherein a user may create or edit an element list; 4. Connector Library, per button 20, wherein the user may obtain a listing of, and select from, all connectors and templates in the system; and 5. Output/Reports, per button 22, wherein the user may use existing connectors to create output reports or actual output data files.

Figure 2:
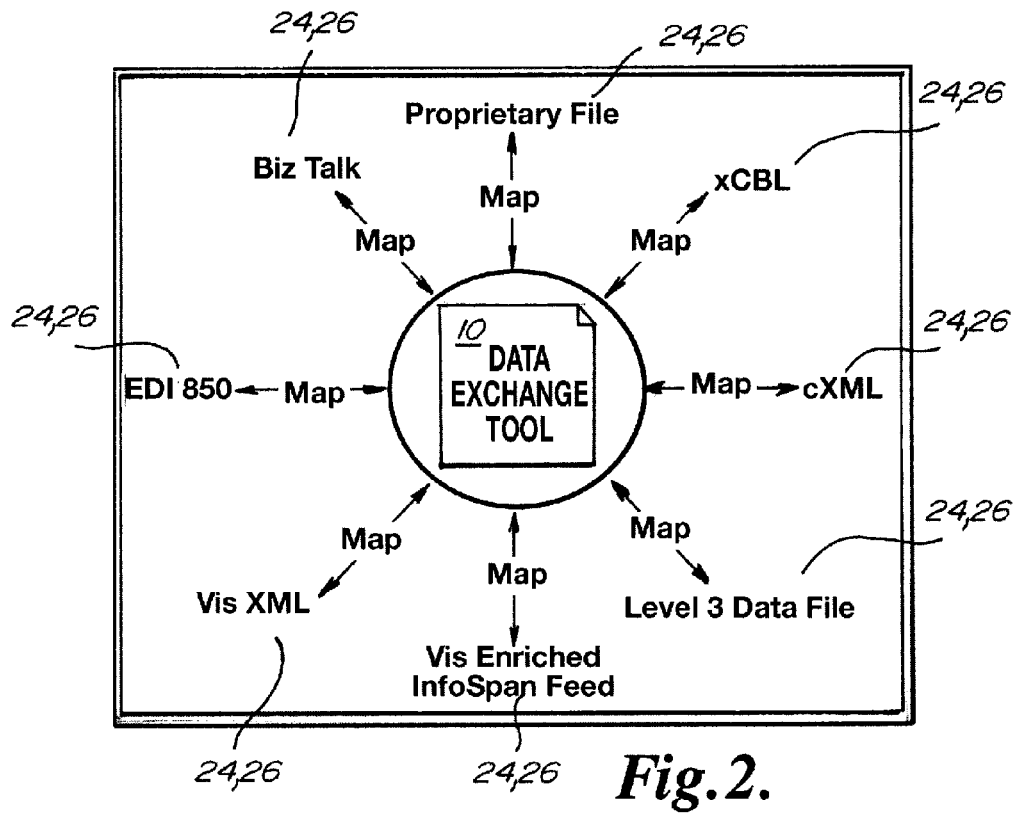
FIG. 2 provides an overview diagram of the mapping functionality of the data exchange tool of the present invention.

The data exchange tool of the present invention can be thought of in terms of the diagram of FIG. 2. As shown, any given file type, e.g., Visa XML, EDI 850, BizTalk, Proprietary File, xCBL, cXML. Level 3 Data File, Visa Enriched InfoSpan Feed, etc., can be imported as an input file 24, and displayed in an easy-to-read tree diagram. The file 24 can then be mapped to a desired output file 26 type using the pre-selected key data elements for that file type, or by adding or deleting key elements. The user can easily view the current mapping via report, or by creating an output file of the desired type. The tool 10 can be though of as a hub and spokes, with any of the file types shown functioning as input 24 or output 26 file types. The mapped version can be saved and reused for future mapping needs.

The data exchange tool 10 of the present invention enables the user to load in a file with a predefined format, and to define key data elements within that file. These are the data elements that the user deems essential for mapping purposes. They may consist of all or some portion of the data elements present in the source file. For example, the user could read in a source Ariba purchase order. That purchase order could then be compared to the template Ariba purchase order that has been pre-loaded into the data exchange tool 10. The user could then view fields that have already been defined as key for an Ariba purchase order. Depending on mapping needs and requirements, the user could select additional fields or de-select those for which there is no interest or need to map.

The data exchange tool of the present invention preferably comes loaded with a basic set of file templates representing XML file structures and other file structures of the major e-Commerce partners. In the instance of XML files, these templates are actual XML files. Templates representing other file type formats are also preferably included.

Each template preferably contains key data elements that have been mapped (connected) with some number of data elements in the hub. The selected data elements for each file template may be though of as a reference data element library for that template. Additional elements can be selected as "key", or pre-selected data elements can be de-selected. These selected key data elements reflect those data elements that have been defined as important to the user for mapping purposes.

Figure 3:
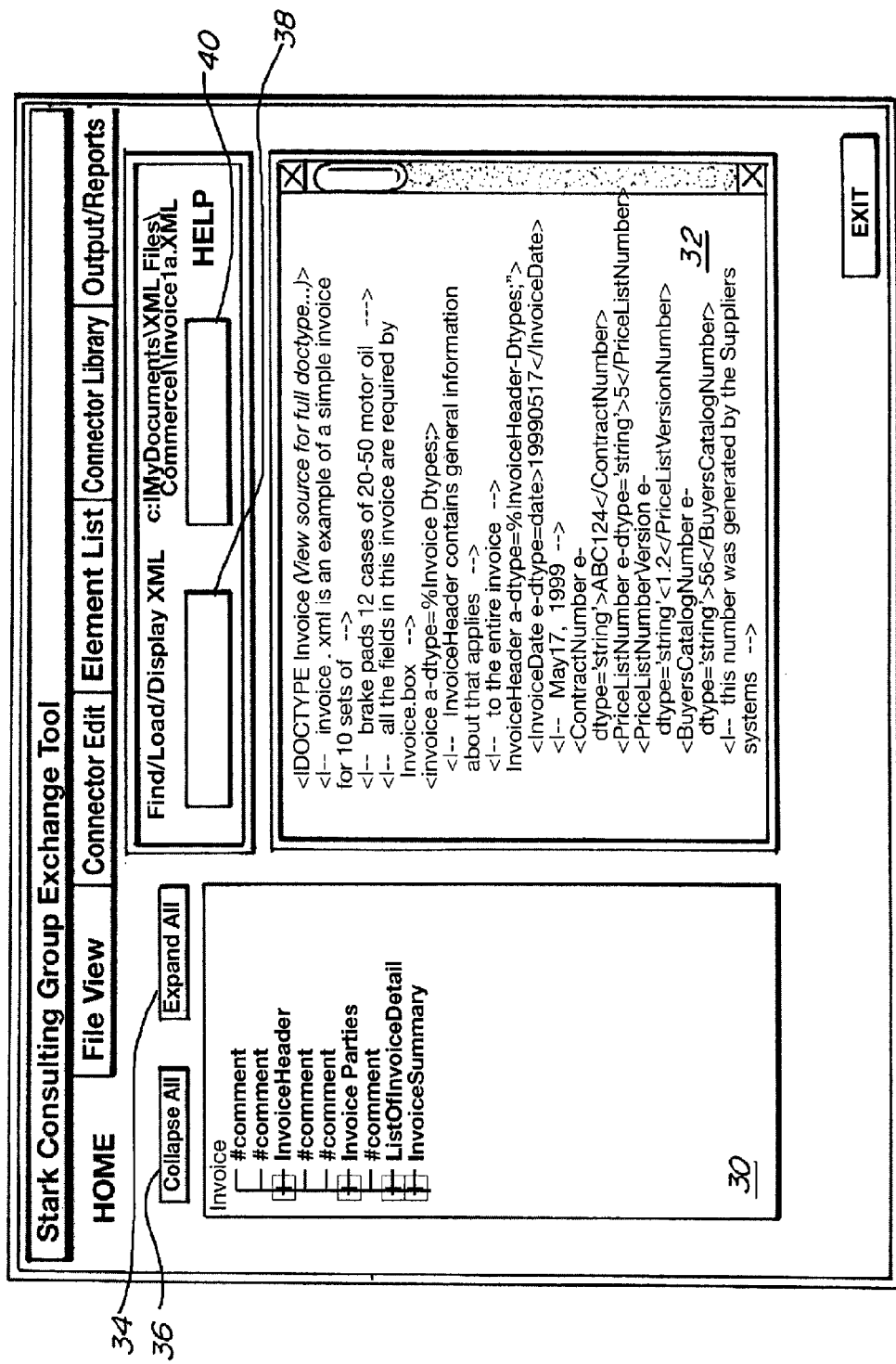
FIG. 3 is an example of a screen that may be used by the data exchange tool to view a loaded file in a basic display format and a detailed display format.

When a file is loaded into the data exchange tool, the screen of FIG. 3 preferably is utilized. This File View screen 28, has a left window 30 displaying the base elements of the file while the right window 32 provides a detailed view of the loaded file showing the tree structure of the file along with all tags, attributes and elements. Buttons are provided to expand or collapse the tree structure displayed, i.e. buttons 34 and 36, respectively, and to load a file, button 38, or create a template from the loaded file, button 40.

Figure 4:
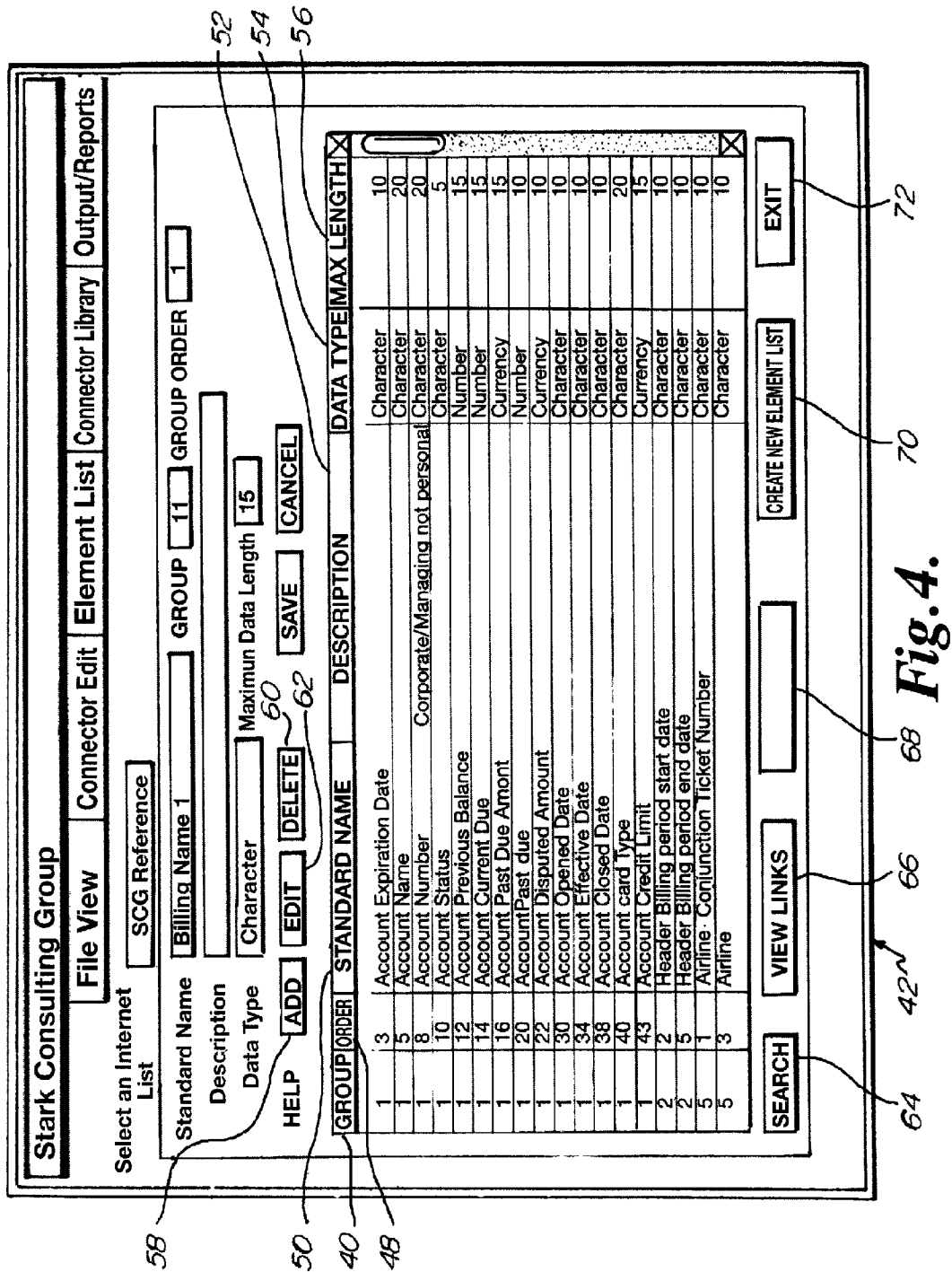
FIG. 4 is an example of a screen that may be used by the data exchange tool to view and edit an element list.

At the core of the data exchange tool is a set of data elements that have been defined as "critical" to the user. This set of data elements is known as a hub. Hubs can be swapped in or out, and a single user may have multiple hubs for use in different situations. A sample screen 42 showing a listing of the data elements of the hub is provided in FIG. 4. As shown each element 44 is provided with a field for a group number 46, an order number 48 within the group, a standard name 50, a description 54, a data type 56, and a maximum length 58. Elements may be added to the element list through use of the add button 58, deleted through use of delete button 60, or edited through use of edit button 62. A user may also search for an element, search button 64, view the elements within various templates to which the element list is linked, view links button 66, link hubs through button 68, create a totally new element list through button 70, or exit via button 72.

Figure 5:
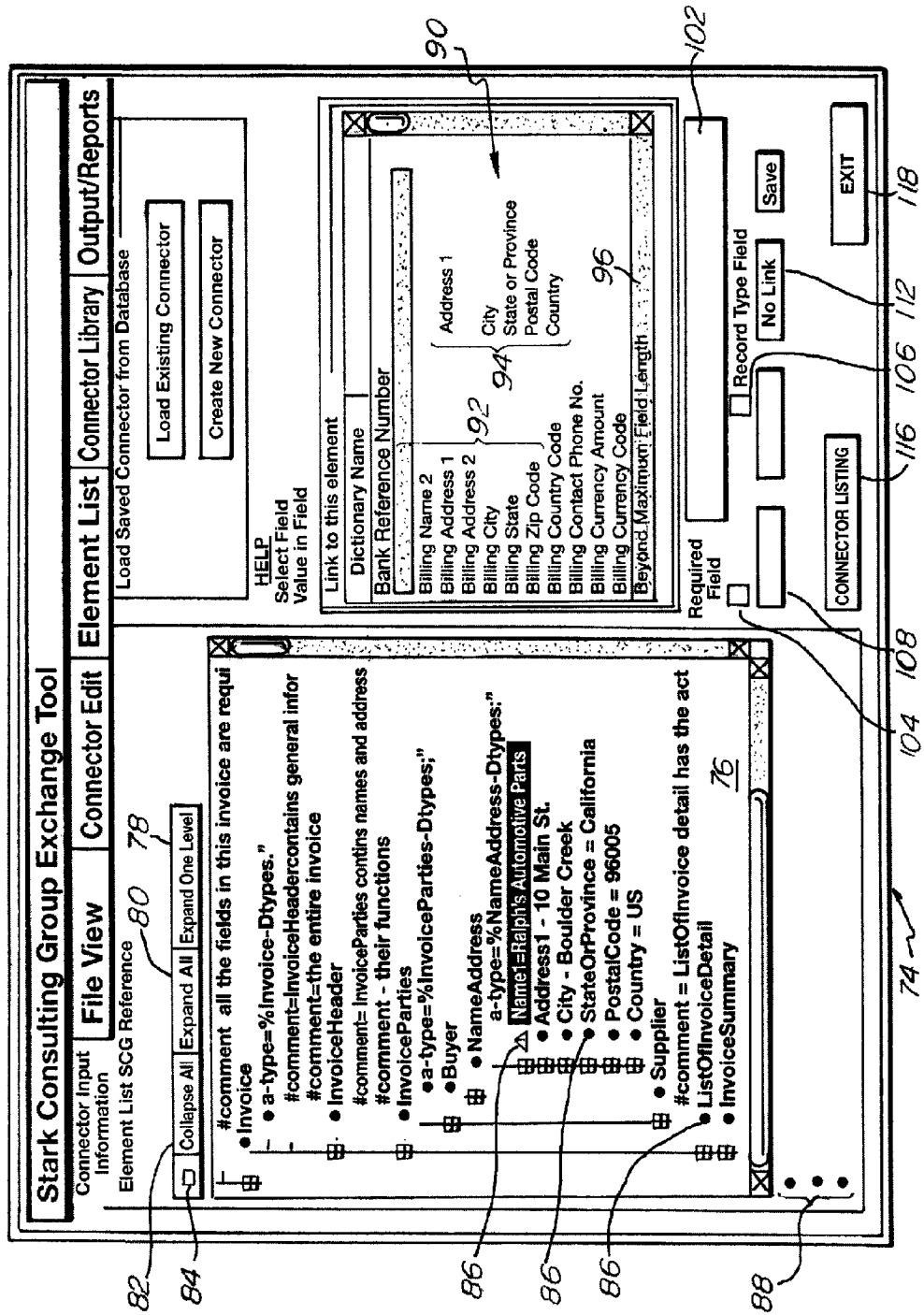
FIG. 5 is an example of a screen that may be used by the data exchange tool to view and edit a connector.

A mapping (connector) screen 74 of the data exchange tool is shown in FIG. 5. The example shown within the contents of FIG. 5 is that of a Commerce One invoice mapped into a previously defined set of key data elements. The Connector Edit screen 74 has a left window 76 that shows the loaded file in a tree structure format, which may be expanded or collapsed via buttons 78, 80, 82, 84. Each branch in the tree structure is provided with an indicator 86, the legend 88 for the indicators 86 are presented below the window 76, telling the user whether the branch and its contents are linked to an element list of a template. The window 90 to the right side of the screen provides the data exchange tool template element list 92 along with the name of the element 94 to which it is linked in the loaded file. Any errors 96 occurring in the linking, e.g. "beyond maximum field length" are displayed at the bottom of the right window. Buttons within the right side of the screen enable to the user to load a connector via button 98, create a new connector via button 100, enter notes in note box 102, indicate if a field is required 104, indicate a record type field 106, search the elements 108, condition the elements 110, prevent a link 112, save the connector 114, perform a connector listing 116, and exit the screen 118.

The data exchange tool 10 is based on comparing the key data elements within this new input file type with key data elements for the output file type desired. The file types can be any file type that the e-commerce partner chooses. The hub of the translation logic of the data exchange tool 10 (e.g., all incoming and outgoing files and data elements) compares key fields in the incoming source file to key fields in the target (outgoing) file type. Invalid data is identified, as are missing fields required by either the source or destination target files. The data exchange tool defines designated key data elements as the reference data library for that file type.

Figure 6:
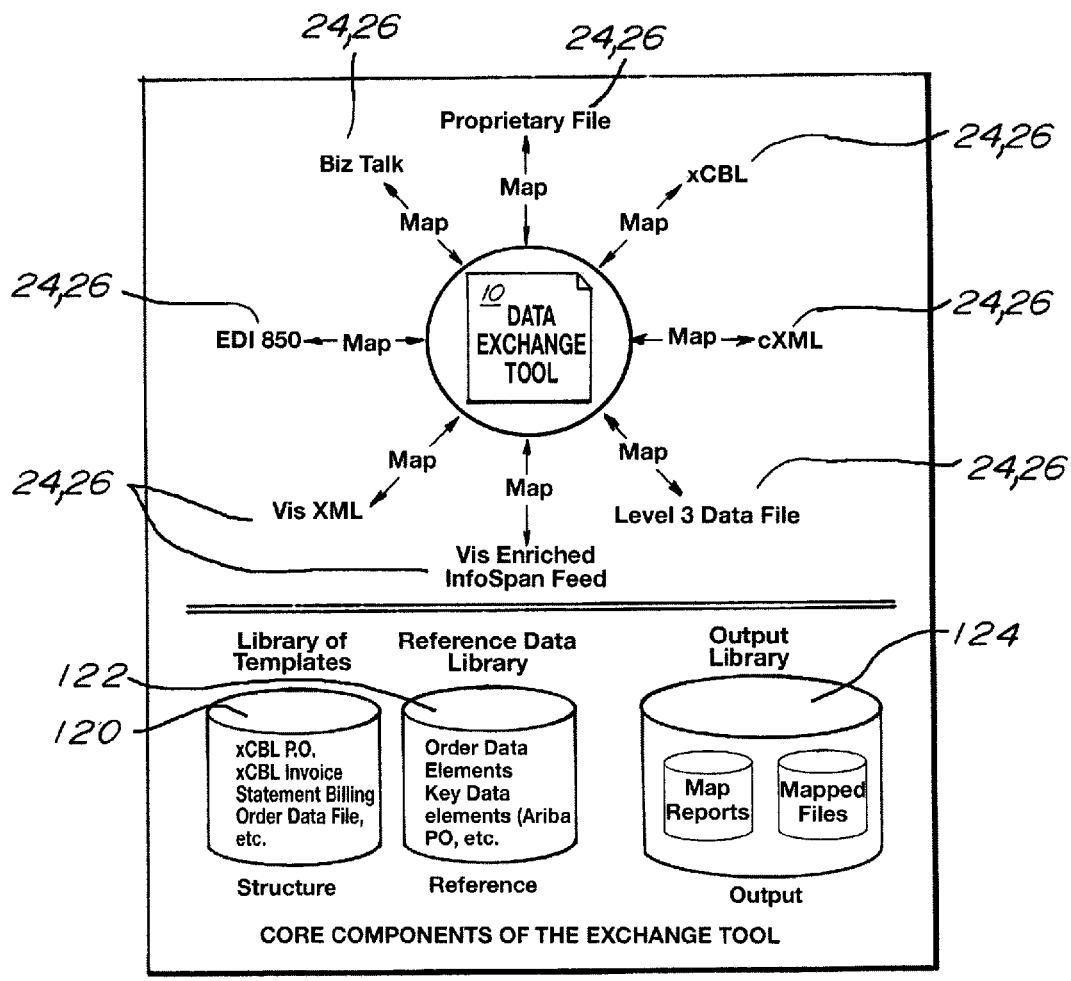
FIG. 6 provides a pictorial representation of the libraries used by the data exchange tool.

Multiple templates and data element reference libraries may be maintained within the tool 10 to allow the user to easily accommodate different business processes and partner's needs. The user can map from one file type to another, saving the desired output in their map library. When the mapping is complete, the user can create a map report or a test file of the reference file type for client testing. This provides for faster prototyping and implementation. FIG. 6 provides a depiction of the various libraries maintained by the data exchange tool 10. As shown, the libraries includes, a library of templates 120 for the various file types and formats, a reference data library 122 that includes order data elements and key data elements, and an output library 124 that includes map reports and mapped files.

The inherent design of the data exchange tool 10 is made of exchange logic, user interfaces, and a master set of file templates. These master file templates (XML, or other) exist in the template library and define key e-commerce file formats and key data elements within each template.

The user can begin using the basic functionality of the data exchange tool 10 immediately by viewing the master templates and beginning to understand their format and mapped data elements. The tool 10 also provides the user with the ability to read in XML and other file types in an easy-to-read manner facilitating understanding of the complex relationships between XML files and their data elements.

The user can map a new file type to a known file type or, more specifically, to a set of data elements defined in that file's reference library in the data exchange. Additional reference data libraries can be built interactively in the system using the create reference data element function. This reference data is then used in the mapping of the new files or templates to existing file types or to other new file types. The tool additionally provides an excellent reference source for the awareness and detail understanding of the complex XML structure.

Key data elements are defined as those fields within a file structure that are to be used in the comparison or translation between file types. This reference data is used to facilitate mapping between input and output file templates. These key data elements form the infrastructure of the mapping and allow the user to analyze and/or map to the new file type based on the user's critical internal data needs. This function allows the user to create, or read-in its proprietary information into the tool. The specification of the user's key fields in the data dictionary allows the user to specify those fields deemed most important for their needs or to define data elements that are not present in the users data, but critical to their e-commerce partners. They may be key fields that a financial institution needs, key fields in a reference XML file type, or other proprietary fields.

A fundamental function of the data exchange tool is the ability to read the various XML files structures more easily. Through the data exchange tool's presentation of an XML format, the user understands more quickly those specific data elements relating to purchasing and financial transactions. The user can read in an actual XML file such as an Ariba 1.1 format. That input file is displayed on the screen in a tree-style format to show the various nodes and branches of the XML structure. XML files that have been read in can be compared to file templates in the existing data exchange tool master template library as well. The user can also review the XML templates in the master library to familiarize themselves with a specific XML format and its related detailed elements.

Users may also read in other file types such as flat files, comma delimited files, or many other proprietary file types. These files can be saved in the master template library also.

Figure 7:
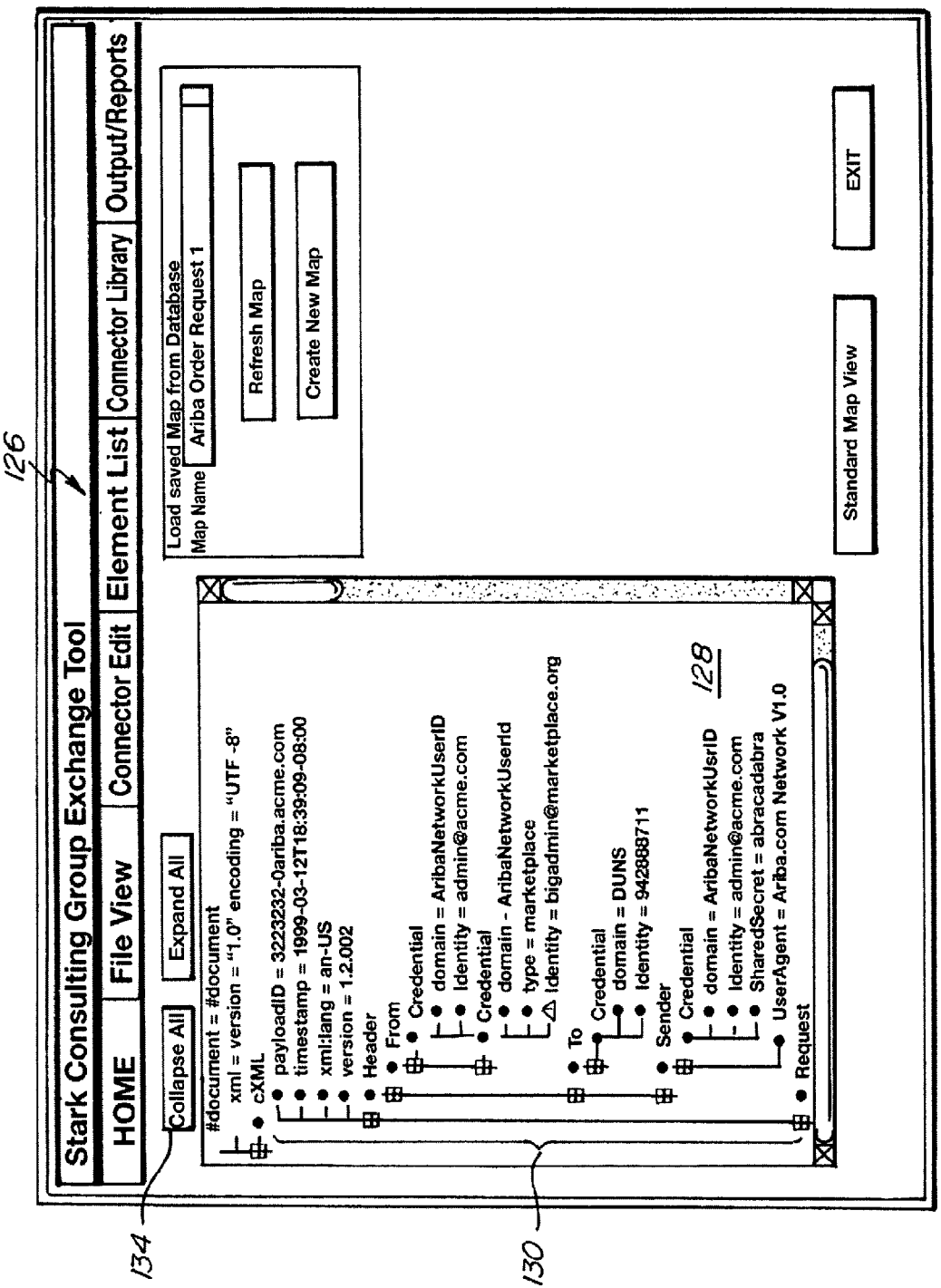
FIG. 7 is an example of a screen that may be used by the data exchange tool to create and view a mapped file.

The user can read in an XML file, such as an Ariba 1.1 format. The user then selects a type of output structure, e.g., Visa XML Invoice. The user then creates a report showing the currently defined mapping from the input file type to the target file: key field name, corresponding Visa Invoice field name, the value found in that field, and any sizes or type errors with the data encountered. FIG. 7 depicts an example of a mapped input file as Maps Create/Edit screen 126. The left window 128 shows a tree structure 130 of the mapped file with the ability to expand 132 or collapse 134, as well as refresh 136 or create a new map 138. Different map 140 views are also an option.

The user can then map other fields based on the user's defined key data elements, if desired. Once the desired mapping has been achieved, the user can select a map report or an actual output file of the reference file type containing all of the fields, which they have just mapped. These map reports or output files can be saved in the Map library.

Figure 8:
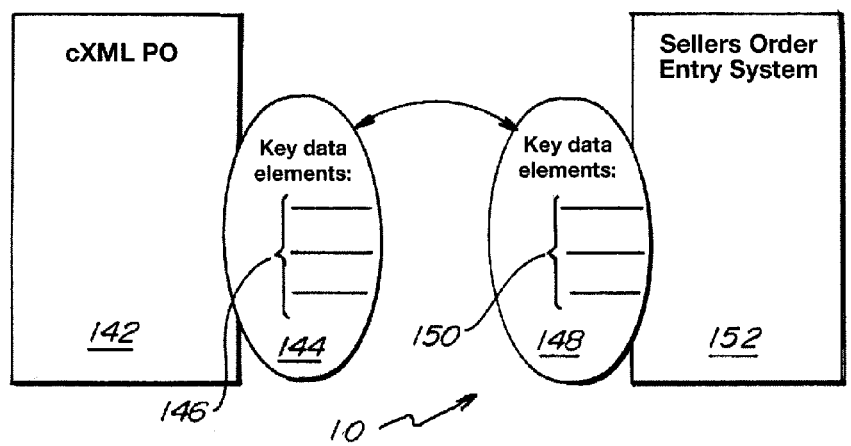
FIG. 8 provides a representation of the mapping activity that occurs within the exchange tool of the present invention.

FIG. 8 provides a pictorial representation of the mapping activity that occurs within the data exchange tool 10, including an input file 142, an input template 144 with key data elements 146 defined, an output template 148 with key data elements 150 defined, and an output file 152. The mapping occurs between 144 and 148. In the depiction of FIG. 8, the output file is the sellers order entry system while the input file is a cXML purchase order. In this instance, the seller could create a template of their order entry system, then quickly define maps for any inbound XML orders.

The data exchange tool 10 preferably provides the feature of mapping from a flat file to a reference data library. Standard flat files, e.g., comma delimited, tab delimited, etc. could also be mapped to specific XML or other proprietary file types. Again, a report can be created which shows key field names, type and size of the field, and where the input file fields are not going to work with the reference data dictionary for the output file type.

Use of the data exchange tool may dramatically reduce the time currently required for system consultants to work with clients to accommodate their needs for varying file structure support within a bank environment.

Figure 9:
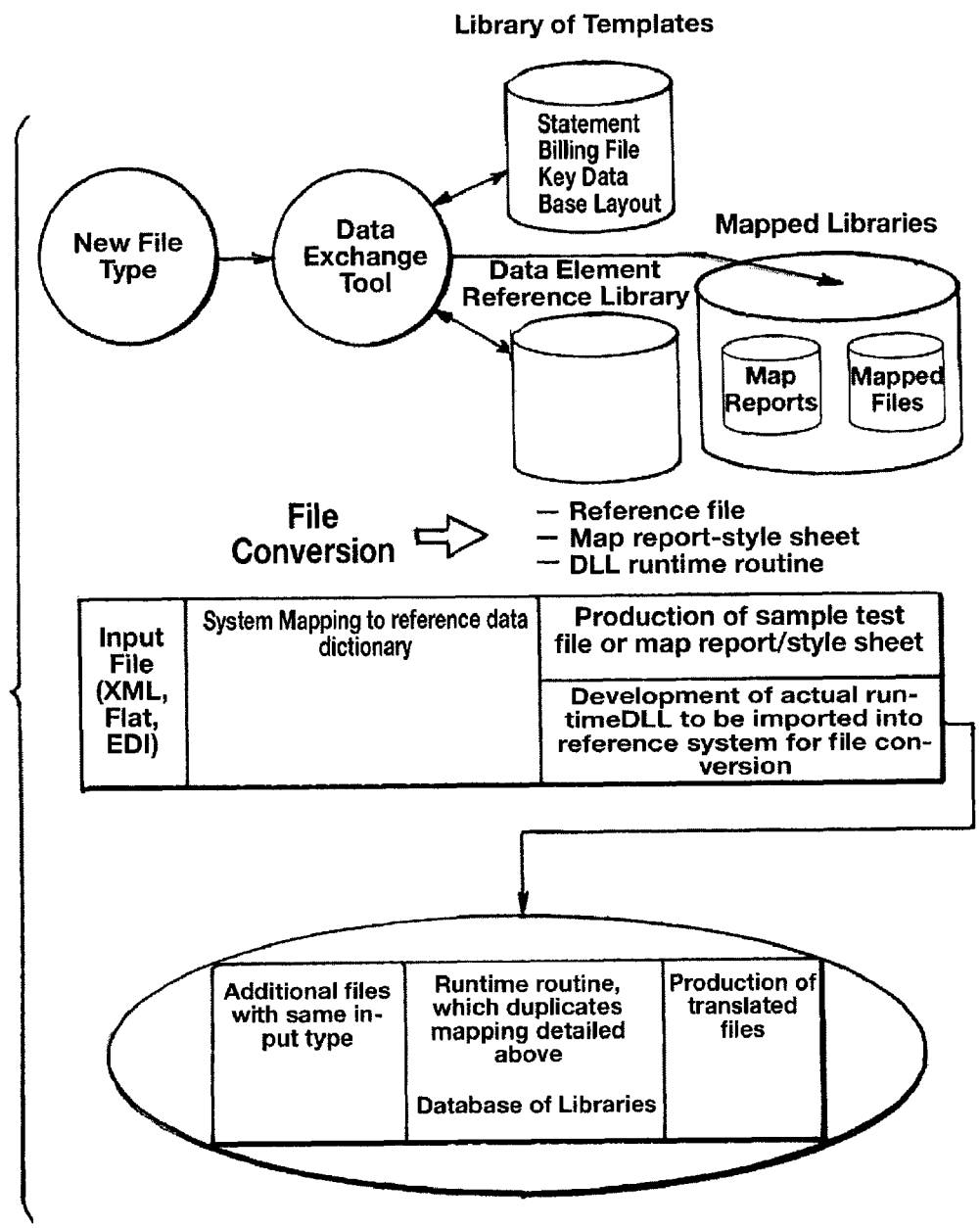
FIG. 9 is an overview pictorial representation of the functionality of the data exchange tool.

FIG. 9 depicts the overall functionality of the data exchange tool of the present invention.

What is claimed is:

1. A method of facilitating mapping data in a first file of a first data file type to a second file of a second data file type, the method comprising:
   providing a proprietary library of data-definition templates stored in a computer-accessible media, said proprietary library of data-definition templates including a plurality of mapping templates associated with a set of publicly defined standard data file formats;
   providing instructions and a computer interface operably associated with said proprietary library of data-definition templates to permit a user to selectively create and selectively modify at least one mapping template for use in automatically translating said first file of said first data file type selected from said set of publicly defined standard file formats to said second file of said second data file type selected from at least one proprietary file format, including instructions for:
      defining a subset of less than all of a plurality of data elements of said at least one mapping template to be associated as critical data elements for said at least one mapping template;
      defining invalid or incomplete data fields as part of said at least one mapping template; and
      defining at least one comment associated with at least one of said critical data elements or said invalid or incomplete data fields;
   automatically generating a data map report representing a selected data map of said first data file type to said second data file type, said data map report presenting all of said data elements of said first type in a first column representing a map of from data, said critical data elements in a second column corresponding to an associated one of said data elements of said first type representing a map of to data and said at least one comment in a third column corresponding to an associated one of said data elements of said first type; and
   utilizing said library of data-definition templates to automatically and selectively map an input data file of a selected one of said first data file type to an output data file of a selected one of said second data file type, wherein said data map report facilitates evaluation of the mapping of said input data file to said output data file.

2. The method of claim 1 wherein automatically generating the data map report includes creating visual indicators for each data element indicating whether that element is mapped.

3. The method of claim 2 wherein the visual indicator indicates an element type selected from the group consisting of: mapped data element, attribute data element and data element with no mapping.

4. The method of claim 1 wherein at least a portion of the automatically generated data map report further comprises a tree view of said first data file of said first file type wherein said tree view comprises data elements, each of which is accompanied by at least one comment indicating an association with at least one of said critical data elements.

5. The method of claim 1 wherein defining the subset of less than all of the plurality of data elements includes defining a data element that is an XML data element.

* * * * *